United States Patent [19]

Klais

[11] Patent Number: 5,059,372

[45] Date of Patent: Oct. 22, 1991

[54] PROCESS AND APPARATUS FOR PRODUCING COMPRESSED SOLID BRIQUETTES

[76] Inventor: Günter Klais, 1625 12 St., N. E., Hickory, N.C. 28601

[21] Appl. No.: 39,469

[22] Filed: Apr. 16, 1987

[51] Int. Cl.[5] ........................ B29C 43/04; B29C 43/36

[52] U.S. Cl. .................................... 264/120; 264/109; 264/334; 425/261; 425/359; 425/415; 425/422; 425/423

[58] Field of Search ............... 264/120, 123, 124, 109, 264/119, 334, 294; 425/359, 422, 423, 412, 415, 353, 261, 447

[56] References Cited

U.S. PATENT DOCUMENTS 3,154,812 11/1964 Haller .............................. 425/422 X
3,736,085 5/1973 Mitchell .......................... 425/422 X
4,544,342 10/1985 Werz et al. .......................... 425/193
4,649,006 3/1987 Heggenstaller ...................... 264/120

*Primary Examiner*—Mary Lynn Theisen
*Attorney, Agent, or Firm*—Louis E. Marn

[57] ABSTRACT

There is disclosed a novel process and apparatus for producing compressed solid briquettes from particulate materials, such as sawdust and like waste by-products wherein the particulate material is compressed into a predetermined briquette-shaped cavity of a mold member and subjected to sufficient compression forces to form the compressed solid briquette whereupon, after removal of the compression forces, the mold member is indexed to a position to permit discharge from the mold cavity of the thus formed compressed solid briquette.

21 Claims, 3 Drawing Sheets

PROCESS AND APPARATUS FOR PRODUCING COMPRESSED SOLID BRIQUETTES

BACKGROUND OF THE INVENTION (1) Field of the Invention

This invention relates to a process and apparatus for producing a compressed solid briquette, and more particularly to an improved process and apparatus for producing a compressed solid briquette from particulate materials, such as wood by-products, peanut shells, and the like.

(2) Description of the Prior Art

Generally, in the production of wood products, significant quantities of sawdust and like waste by-products are generated, causing extensive storage and/or disposal handling problems. Saw dust, for example, has been subjected to extrusion processing wherein the material to be processed is extruded through a cylindrically-shaped chamber under the influence of mechanical or hydraulic pressure to form a rod-like solid. Extrusion under pressure generates heat as a result of friction of temperatures of up to 300° C. Consequently, the product must of necessity be cooled prior to packaging or the like. Since such extrusion processes are effected at elevated temperatures, problems are encountered in the start-up of such processes, resulting in unacceptable initial product as well as equipment breakdown due to thermal stresses.

Peanut shells produced as by-products or peanut processing are not conveniently handled, although possessing certain energy values, as are other waste by-products of other food processing operations.

OBJECTS OF THE INVENTION

An object of the present invention is to provide an improved process and apparatus for handling solid wastes, such as sawdust, peanut shells, and the like to produce compressed solid briquettes.

Another object of the present invention is to provide an improved process and apparatus for handling solid wastes, such as sawdust, peanut shells, and the like to produce compressed solid briquettes at substantially ambient temperatures.

Still another object of the present invention is to provide an improved process and apparatus for handling solid wastes, such as sawdust, peanut shells, and the like to produce compressed solid briquettes obviating problems associated with high temperature operation of extrusion processes.

A further object of the present invention is to provide an improved process and apparatus for handling solid wastes, such as sawdust, peanut shells, and the like to produce compressed solid briquettes in a more efficacious manner.

A still further object of the present invention is to provide an improved process and apparatus for handling solid wastes, such as sawdust, peanut shells, and the like to produce compressed solid briquettes eliminating dangerous situations inherent in material handling and/or storage.

Yet another object of the present invention is to provide an improved binderless process and apparatus for handling solid wastes, such as sawdust, peanut shells, and the like by forming compressed solid briquettes which are easily handled, stored, and/or used in waste heat boilers.

SUMMARY OF THE INVENTION

These and other objects of the present invention are achieved in a novel process and apparatus for producing compressed solid briquettes from particulate materials, such as sawdust and like waste by-products wherein the particulate material is compressed into a predetermined briquette-shaped cavity of a mold member and subjected to sufficient compression forces to form the compressed solid briquette whereupon, after removal of the compression forces, the mold member is indexed to a position to permit discharge from the mold cavity of the thus formed compressed solid briquette.

BRIEF DESCRIPTION OF THE DRAWING

A better understanding of the present invention will be had by reference to the following detailed description when taken with the accompanying drawings wherein like numerals designate like parts throughout and wherein.

DETAILED DESCRIPTION OF THE INVENTION

Figure 1:
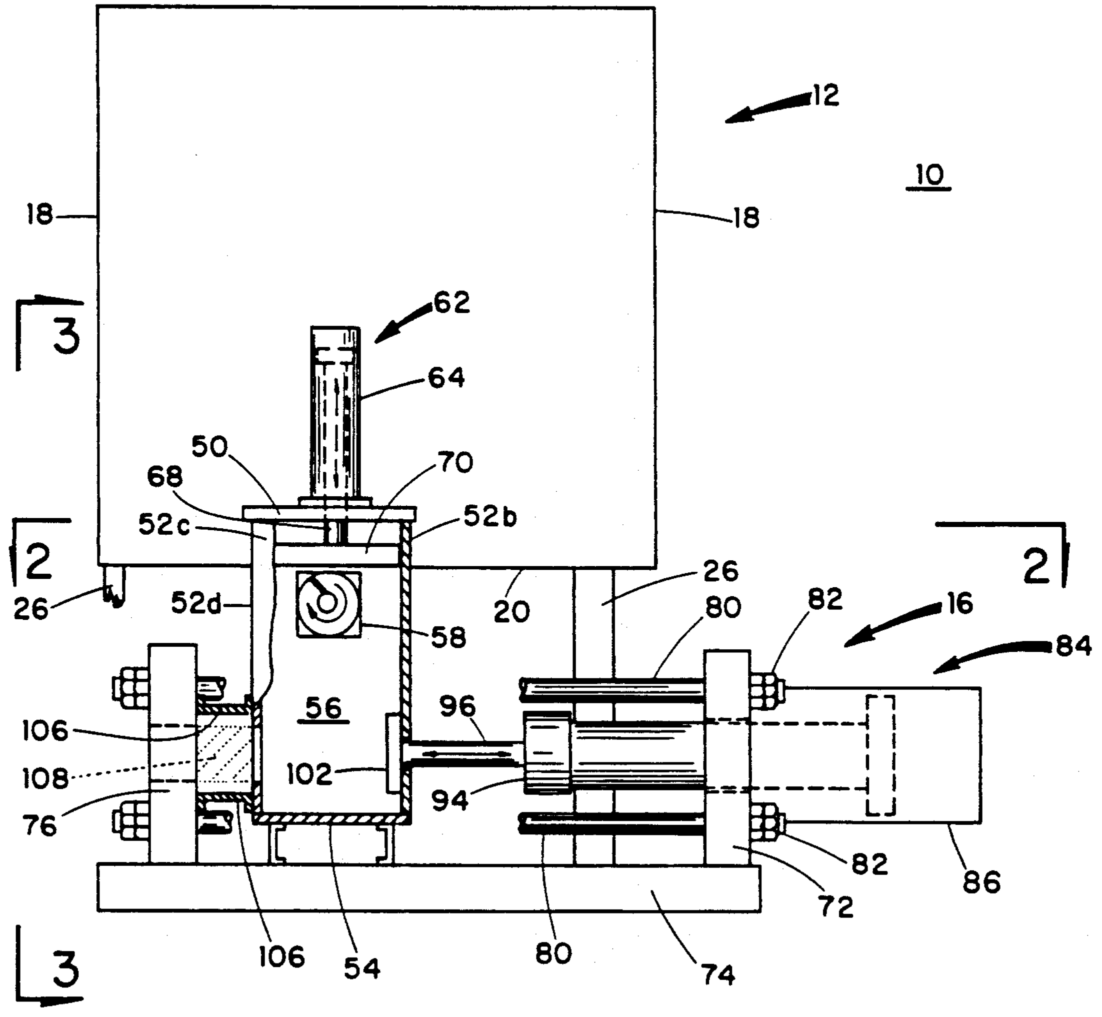
FIG. 1 is a front view of the apparatus of the present invention.
Figure 2:
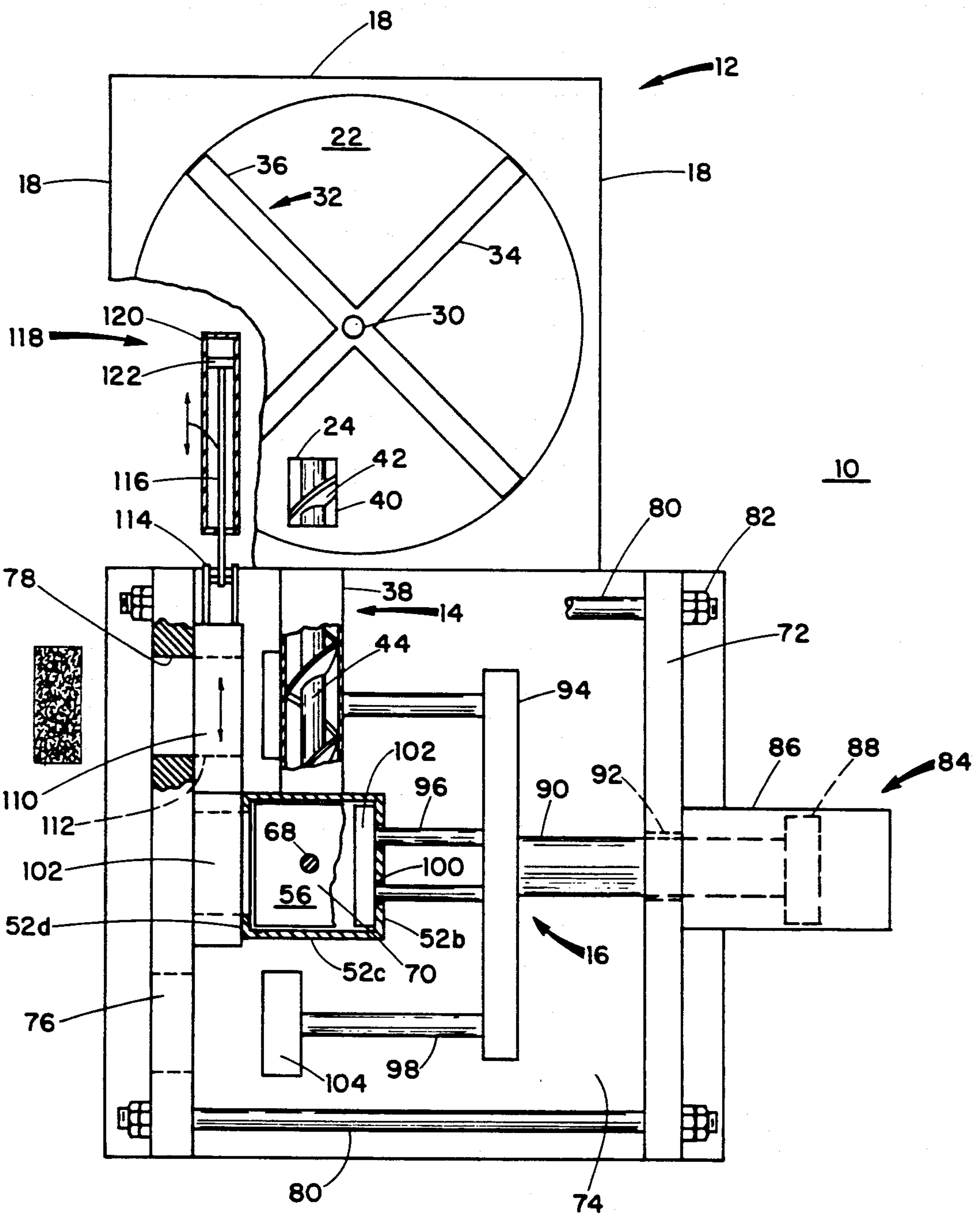
FIG. 2 is a top view thereof.
Figure 3:
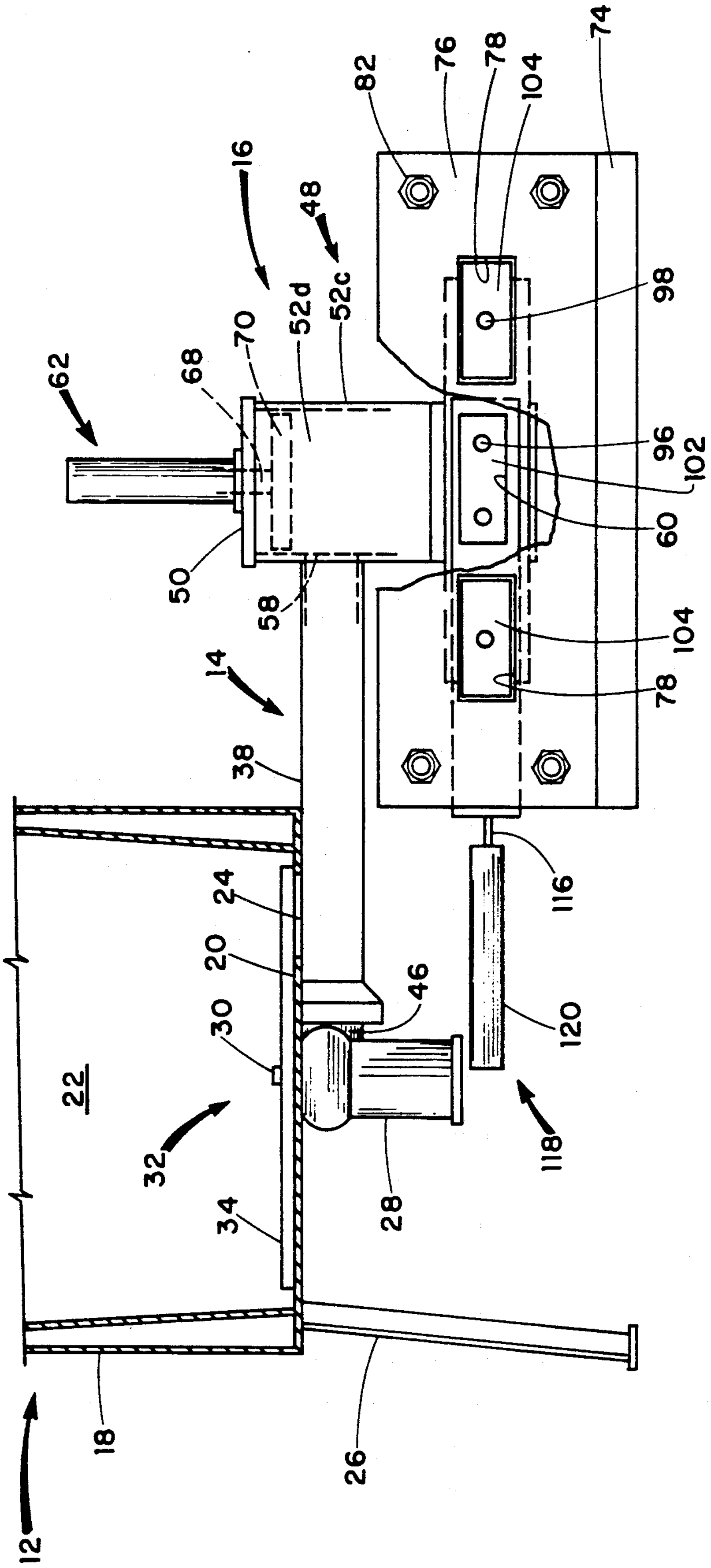
FIG. 3 is a side view thereof, partially cut-away.

Referring now to the drawings, and in particular to FIGS. 1 to 3, there is illustrated a solids briquetting assembly of the present invention, generally indicated as 10 and comprised of a storage tank assembly, a solids feed conveying assembly, and a briquette-forming assembly, generally indicated as 12, 14, and 16, respectively, positioned on a suitable foundation.

The storage tank assembly 12 is formed of vertically-disposed side walls 18 mounted to one another and to a square-shaped bottom wall member 20 defining a particulate material storage and mixing chamber 22 opened at the top for the introduction of particulate solids material to be processed. The square-shaped bottom wall member 20 is formed with an elongated rectangularly-shaped opening 24, referring particularly to FIG. 2, and is mounted on a plurality of vertically-disposed support legs 26.

Centrally positioned and mounted to the square-shaped bottom wall member 20 of the storage tank assembly 12, there is provided a vertically-disposed motor assembly 28 including a shaft 30 extending upwardly into the particulate material storage and mixing chamber 22, referring particularly to FIG. 3. To the shaft 30 extending into the particulate material storage and mixing chamber 22, there is mounted for rotation a horizontally-disposed stirrer assembly, generally indicated as 32, including outwardly-extending arm members 34 for admixing the particulate solids material in the particulate material storage and mixing chamber 22 as well as directing such particulate material to the opening 24. Extending upwardly into the particulate material storage and mixing chamber 22 and mounted to the upper portion of the shaft 30, there is positioned a vertically-disposed screw member 36 to aid in effecting the gravity flow of the particulate solids material within the particulate material storage and mixing chamber 22.

The solids feed conveying assembly 14 is comprised of an elongated square-shaped conduit member 38 mounted to a lower surface portion of the bottom wall member 20 and is formed with a rectangularly-shaped opening 40 in an upper portion thereof for positioning coincident with the opening 24 in the bottom wall member 20. The conduit member 38 is mounted to the bottom wall member 20 and extends horizontally therefrom towards and is mounted to the briquette-forming assembly 16. Positioned within the conduit member 38, there is provided a conveying screw member 42 mounted on a shaft 44 mounted for rotation to a motor 46. The motor 46 is mounted on an end portion of the conduit member 38. The conduit member 38 provides for particulate solids communication between the particulate material storage and mixing chamber 22 and the briquette-forming assembly 16, as more fully hereinafter described.

The briquette-forming assembly 16 is comprised of a compacting vessel 48 formed by a top wall member 50, side walls *52a*, *52b*, *52c* and *52d*, and a bottom wall member 54 defining a compacting chamber 56, referring particularly to FIGS. 1 and 3. The side wall *52a* juxtaposed to the solids feed conveying assembly 14 is formed with an opening 58 to provide for particulate solids communication into the compacting chamber 56 via the conduit member 38. In a lower portion of the side wall *52d* there is formed a rectangularly-shaped opening 60, as more fully hereinafter discussed. On the top wall member 50 of the compacting vessel 48, there is mounted a vertically-disposed hydraulic assembly, generally indicated as 62, referring particularly to FIG. 3, comprised of a cylindrically-shaped housing member 64 in which is positioned for reciprocal movement a piston member 66 mounted to a shaft member 68 extending into the compacting chamber 56.

To the shaft member 68 extending into the compacting chamber 56, there is mounted a horizontally-disposed compacting plate member 70 horizontally dimensioned to fit within the compacting chamber 56 during reciprocating vertical movement of the horizontally-disposed compacting plate member 70 within the compacting chamber 56 of the compacting vessel 48. The compacting plate member 70 is dimensioned to freely move within the compacting chamber 56 without interference from particulate solids material which may become lodged between the compacting plate member 70 and the inner wall surfaces of the compacting vessel 48.

The briquette-forming assembly 16 includes a vertically-disposed support wall member 72 parallelly-disposed to the solids feed conveying assembly 14 positioned on a support frame 74 positioned on the foundation. Disposed in paralleled and spaced-apart relationship to the support wall member 72, there is similarly positioned on the support frame 74 a vertically-disposed support wall member 76 including ejection orifices 78. The support wall members 72 and 76 are fixedly-positioned with respect to one another, such as by threaded rod members 80 and corresponding bolts 82.

To an outer surface portion of the support wall member 72 there is mounted a horizontally-disposed hydraulic assembly, generally indicated as 84, referring particularly to FIG. 2, and comprised of cylindrically-shaped housing member 86 in which is positioned for reciprocal movement a piston member 88 mounted to a shaft member 90 extending through an orifice 92 in the support wall member 72. To the end of the shaft member 90, opposite the piston member 88, there is mounted a vertically-disposed rectangularly-shaped pressure support plate member 94.

On an outer surface portion of the pressure support plate member 94, facing the support wall member 76, there are mounted horizontally-disposed paired intermediate rod members 96 and side rod members 98. Each of said side rod members 98 is disposed on either side of the paired intermediate rod members 96. The paired intermediate rod members 96 are of a length less than the length of the side rod members 98. The paired intermediate rod members 96 extend through orifices 100 formed in a lower portion of the side wall *52b* of the compacting vessel 48, generally in co-axial alignment with the rectangularly-shaped opening 60 formed in the lower portion of the side wall *52d* of the compacting vessel 48.

On the ends of the paired intermediate rod members 96 extending into the lower portion of the compacting chamber 56, there is mounted a rectangularly-shaped vertically-disposed compression plate member 102 in co-axial alignment with rectangulary-shaped opening 60 in the side wall *52d* and generally of a larger cross-sectional area than the area defined by the rectangularly-shaped opening 60 to prevent extension of the plate member 102 into orifice 60 in the side wall *52d* of the compacting vessel 48 during operation of the solids briquetting assembly 10. To the end of each side rod member 98, there is mounted a vertically-disposed ejection plate member 104.

Positioned between the support wall member 76 and above and below the opening 60 in the side wall *52d* of the compacting vessel 48, there are provided spaced-apart and parallelly-disposed upper and lower spacer bar elements 106, referring particularly to FIG. 1. The spaced-apart and parallelly-disposed upper and lower spacer bar elements 106 define a tool die receiving area 108 for positioning an elongated rectangularly-shaped in cross-section briquette-forming tool 110. The height and width dimensions of the elongated rectangularly-shaped in cross-section briquette-forming tool 110 are slightly less than the corresponding dimensions of the tool die receiving area 108 whereby the elongated rectangularly-shaped cross-section briquette-forming tool 110 may be readily reciprocatingly moved transversely within the tool die receiving area 108 as more fully hereinafter discussed. The elongated briquette-forming tool 110 is formed with two rectangularly-shaped chambers 112, e.g. 12"×3"×4", or of any desired product shape.

The elongated briquette-forming tool 110 is provided with parallelly-disposed mounting plates 114 for affixing to a shaft 116 of a horizontally-disposed hydraulic assembly, generally indicated as 118, and comprised of a cylindrically-shaped housing member 120 in which is positioned by reciprocal movement a piston member 122.

Prior to describing the operation of the solids briquetting assembly 10 of the present invention, the piston members 66 and 88 of the vertically-disposed hydraulic assembly 62 and the horizontally-disposed hydraulic assembly 84, respectively, are in a retracted position whereby the compacting plate member 70 is disposed in an upper portion of the compacting chamber 56 of the compacting vessel 48 and the vertically-disposed rectangularly-shaped pressure support plate member 94 is disposed in a portion of the compacting chamber 56 of the compacting vessel 48 opposite the opening 60 in the side wall *52d* thereof. Additionally, the piston member 122 of the horizontally-disposed hydraulic assembly 118 is in a retracted position whereby the outer chamber 112 of the elongated briquette-forming tool 110 is juxtaposed to the opening 60 in the side wall *52d* of the compacting vessel 48 as illustrated in FIG. 2. In such position, the chamber 112 is opened to the opening 60 in the side wall 52*d* of the compacting vessel 48 and is closed at the other side by the support wall member 76.

In operation, particulate solid material to be formed into briquettes varying from powder of from 1 to 10 microns to chips of from 1 to 1.5", such as sawdust, is introduced into the storage tank assembly 12 to a level sufficient to initiate operation of the briquetting assembly 10. Initiation of operation includes the energizing of the vertically-disposed motor assembly 28 to thereby cause the horizontally-disposed stirrer assembly 32 to rotate about a horizontal plane within the storage tank assembly 12. The conveying screw member 42 is caused to rotate intermittently within the elongated square-shaped conduit member 38 in response to a feed cycle of particulate solid material into the compacting vessel 48. Particulate material is caused to flow by gravity into the elongated square-shaped conduit member 38 and thus through the elongated square-shaped conduit member 38 for introduction through the opening 58 in the side wall 52*a* into the upper portion of the compacting chamber 56 of the compacting vessel 48.

In a predetermined timing sequence after introduction of a predetermined quantity of particulate solid material into the compacting chamber 56, rotation of the conveying screw member 42 is stopped and the hydraulic assembly 62 is activated to cause the piston member 66 to move downwardly to thereby cause downward movement of the compacting plate member 70 to compact the particulate solid material into the lower portion of the compacting chamber 56 of the compacting vessel 48. With the elongated briquette-forming tool 110 in the position illustrated in FIG. 2 as hereinabove discussed, the hydraulic assembly 84 is activated in a predetermined timing sequence to cause the piston member 88 thereof to move vertically outward to thereby extend the pressure support plate member 94 and concomitant movement of the compression plate member 102 for introduction at a pressure of from 60 to 230 tons of the particulate solids material through the opening 60 and into the chambers 112 of the elongated briquette-forming tool 110 against the support wall member 76.

Upon compacting and/or compression of the particulate solids material within the chamber 112, the hydraulic assembly 84 is activated to cause the piston member 88 to be retracted into the hydraulic assembly 84 to thereby cause the pressure support plate member 94 (and compression plate member 102) to move (from left to right), referring to FIG. 2. Simultaneously, with the retraction of the shaft member 90 into the hydraulic assembly 84, the hydraulic assembly 62 is activated to cause the piston member 66 and accompanying shaft member 68 to be retracted into the cylindrically-shaped member 64 and thereby raise the compacting plate member 70 within the compacting vessel 48 to an uppermost position.

Concurrently, with the activation of the hydraulic assembly 62 and the hydraulic assembly 84, the hydraulic assembly 118 is activated whereby the piston member 122 is caused to extend outwardly from the cylindrically-shaped housing member 120 to thereby move the elongated briquette-forming tool 110 within the tool die receiving area 108 whereby the inner chamber 112 thereof is placed in co-axial alignment with the opening 60 in the side wall 52*d*, and concomitantly positioning the outer chamber 112 including briquette 124 in co-axial alignment with the outer side rod member 98 and ejection plate 104 mounted thereon.

In a subsequent briquette-forming operation including the activation of the hydraulic assembly 84 and the extension of the pressure support plate member 94, the ejection plate 104 mounted on the outer side rod member 98 is caused to pass through the plane of the outer chamber 112 and push the thus formed briquette 124 through the ejection orifice 78 in the support wall member 76 for subsequent handling including stacking and storage. In such operation of the solids briquetting assembly 10, a briquette is formed in each sequence of positioning of the briquette-forming tool 110 which is ejected through alternating ejection orifices 78 in the support wall member 76 of the briquette-forming assembly 16.

Generally, to insure smooth, uninterrupted operation of the briquetting assembly 10 of the present invention, the shaft member 68 of the hydraulic assembly 62 is dimensioned such that the compacting plate member 70 disposed in the compacting vessel 48 and mounted to the shaft member 68 in an extended position of the piston member 66 is above a plane defined by the upper edge of the compression plate member 102 mounted to the paired intermediate rod members 96 to thereby prevent any contact and thus interference in operation between the compacting plate member 70 and compression plate member 102. Additionally, as hereinabove mentioned, the width and height of the compression plate member 102 is larger than at least the width and preferably both the height and width of the opening 60 formed in the side wall 52*d* to prevent insertion of the compression plate member 102 into the opening 60 with possible jamming of the compression plate member 102 therein.

Since the compression plate member 102 cooperating with the elongated briquette-forming tool 110 is mounted to the support wall member 72 cooperating with the support frame wall member 76, the compression forces are distributed therebetween with minimal effects (distortional forces, stress, etc.) on the other elements of the briquetting assembly 10.

In accordance with the process of the present invention, particulate solids briquettes are formed from particulate solids materials, such as sawdust, peanut shells, and the like, and thus without any requirement for binder substances or the like. Additionally, production of such particulate solids briquettes is effected using hydraulic pressure in the range of from 60 to 230 tons wherein hydraulic pressures are effected on the particulate solids material being processed in a manner to minimize the effect of such pressures on elements of the assembly and further to provide for substantiallly process-free operational cycles.

While the present invention has been described in connection with an exemplary embodiment thereof, it will be understood that many modifications will be apparent to those of ordinary skill in the art, and that this application is intended to cover any adaptations or variations thereof. Therefore, it is manifestly intended that this invention be only limited by the claims and the equivalents thereof.

What is claimed:

1. An apparatus for forming a compressed solid from particulate materials, which comprises:

a compacting vessel having side and bottom walls defining a compacting chamber and having an opening disposed in a lower portion of a side wall thereof;

means for introducing said particulate material into said compacting vessel;

die member having two chambers defining a solids configuration of said compressed solid and in solids communication with said opening in said wall of said compacting vessel, said die member being mounted for reciprocal movement between said compacting vessel wherein said chambers are alternately positioned in alignment with said opening in said compacting vessel;

support plate member disposed against said die member on a side opposite said compacting vessel;

means for compressing said particulate material from said compacting vessel into a chamber of said die member and including a plate member vertically-disposed for reciprocating movement within said lower portions of said compacting vessel; and means for ejecting said thus formed compressed solid from said chamber of said die member.

2. The apparatus as defined in claim 1 wherein said compacting vessel includes means for compacting said particulate material within said compacting vessel.

3. The apparatus as defined in claim 2 wherein said plate member is mounted to a hydraulic cylinder assembly.

4. The apparatus as defined in claim 3 wherein said hydraulic cylinder assembly is capable of compression forces of from 60 to 230 tons.

5. The apparatus as defined in claim 2 wherein a support plate member is positioned on a side of said chamber of said die member opposite said vertically-disposed plate member.

6. The apparatus as defined in claim 5 wherein said support plate member is provided with an ejection chamber and wherein means are provided for moving said die member to position said chamber of said die member including compressed solid coincident with said ejection chamber for removal of said compressed solid from said apparatus.

7. The apparatus as defined in claim 6 wherein said means for moving said die member is a hydraulic cylinder assembly and said die member is moved in a reciprocating motion.

8. The apparatus as defined in claim 6 wherein said hydraulic cylinder assembly is mounted to another support plate member, said support plate members being mounted to one another.

9. The apparatus as defined in claim 2 and further including storage means in solids communication with said means for introducing particulate material into said compacting vessel.

10. The apparatus as defined in claim 2 and further including a compacting plate member disposed in said compacting vessel for compacting said particulate material into said lower portion of said compacting vessel.

11. The apparatus as defined in claim 10 wherein said compacting plate member is mounted to a hydraulic cylinder assembly.

12. The apparatus as defined in claim 10 wherein said compacting plate member is mounted for reciprocating movement within said compacting vessel.

13. The apparatus as defined in claim 12 wherein in a lowered position said compacting plate member is disposed above said vertically-disposed plate member.

14. A process for forming a compressed solid from particulate material, which comprises the steps of:

a) introducing said particulate material into a compacting zone of a compacting vessel having side and bottom walls and having a solids transfer opening in a wall thereof;

b) positioning a compacting chamber of a die member including two compacting chambers of a preselect solid configuration proximate said solids transfer opening of said compacting vessel;

c) compressing said particulate material from said compacting chamber through said solids transfer opening into said compacting chamber of said die member to form said compressed solid;

d) moving said die member to position another compacting chamber of said die member in alignment with said solids transfer opening; and e) ejecting said compressed solid from a compacting chamber of said die member including said compressed solid.

15. The process as defined in claim 14 wherein said particulate material is compacted prior to step c).

16. The process as defined in claim 14 wherein said particulate material is compressed at pressures of from 60 to 230 tons.

17. The process as defined in claim 14 wherein said particulate material of a particle size of from 1 micron to 1.5 inches.

18. The process as defined in claim 14 wherein said particulate material is sawdust.

19. The process as defined in claim 15 wherein the particulate material is stored in a storage zone prior to step a).

20. The process as defined in claim 14 wherein said compacting chamber of said die member is enclosed on one side by a pressure support plate member to provide support for step c).

21. The process as defined in claim 20 wherein said pressure support plate member includes rejection openings to be aligned with a compacting chamber including a compressed solid after step c) and prior to step d).

* * * * *